United States Patent [19]

Ohnuma et al.

[11] Patent Number: 5,751,929
[45] Date of Patent: May 12, 1998

[54] IMAGE PROCESSING APPARATUS

[75] Inventors: Nobuo Ohnuma; Takatoshi Ohta, both of Yokohama, Japan

[73] Assignee: Canon Kabushiki Kaisha, Japan

[21] Appl. No.: 594,439

[22] Filed: Jan. 31, 1996

[30]  Foreign Application Priority Data

Feb. 1, 1995 [JP]  Japan ..................... 7-015062
 Feb. 1, 1995 [JP]  Japan ..................... 7-015064

[51] Int. Cl.⁶ ..................................................... G06F 15/00
[52] U.S. Cl. .................................................................. 395/129
[58] Field of Search ................................. 395/128, 129, 395/131; 358/445, 451

[56]  References Cited

U.S. PATENT DOCUMENTS 5,469,198  11/1995  Kadonaga ..................... 347/41
5,568,597  10/1996  Nakayama et al. ................ 395/132

FOREIGN PATENT DOCUMENTS 0582433   2/1994  European Pat. Off. .
6-91881    4/1994  Japan .
6-99614    4/1994  Japan .

*Primary Examiner*—Phu K. Nguyen
*Attorney, Agent, or Firm*—Fitzpatrick, Cella, Harper & Scinto

[57]  ABSTRACT

An image processing apparatus is constructed by a C signal multi-level forming circuit, an M signal multi-level forming circuit, and a Y signal multi-level forming circuit for receiving multi-level color image data and multi-level black image data of a low resolution, converting the inputted multi-level color image data into data of at least three levels consisting of two bits, and converting into data of a higher resolution than the input data; a K signal binarization circuit and a smoothing processing unit for converting the inputted black image data into the binary data and converting into data of a higher resolution than the input data by a smoothing process, and a print unit for forming a color image on the basis of the binary C, M, Y and K data converted into the high resolution data. The multi-level color data and black image data are doubled and a multi-level memory to store the doubled data is unnecessary. The recording can be performed at a high resolution.

14 Claims, 9 Drawing Sheets

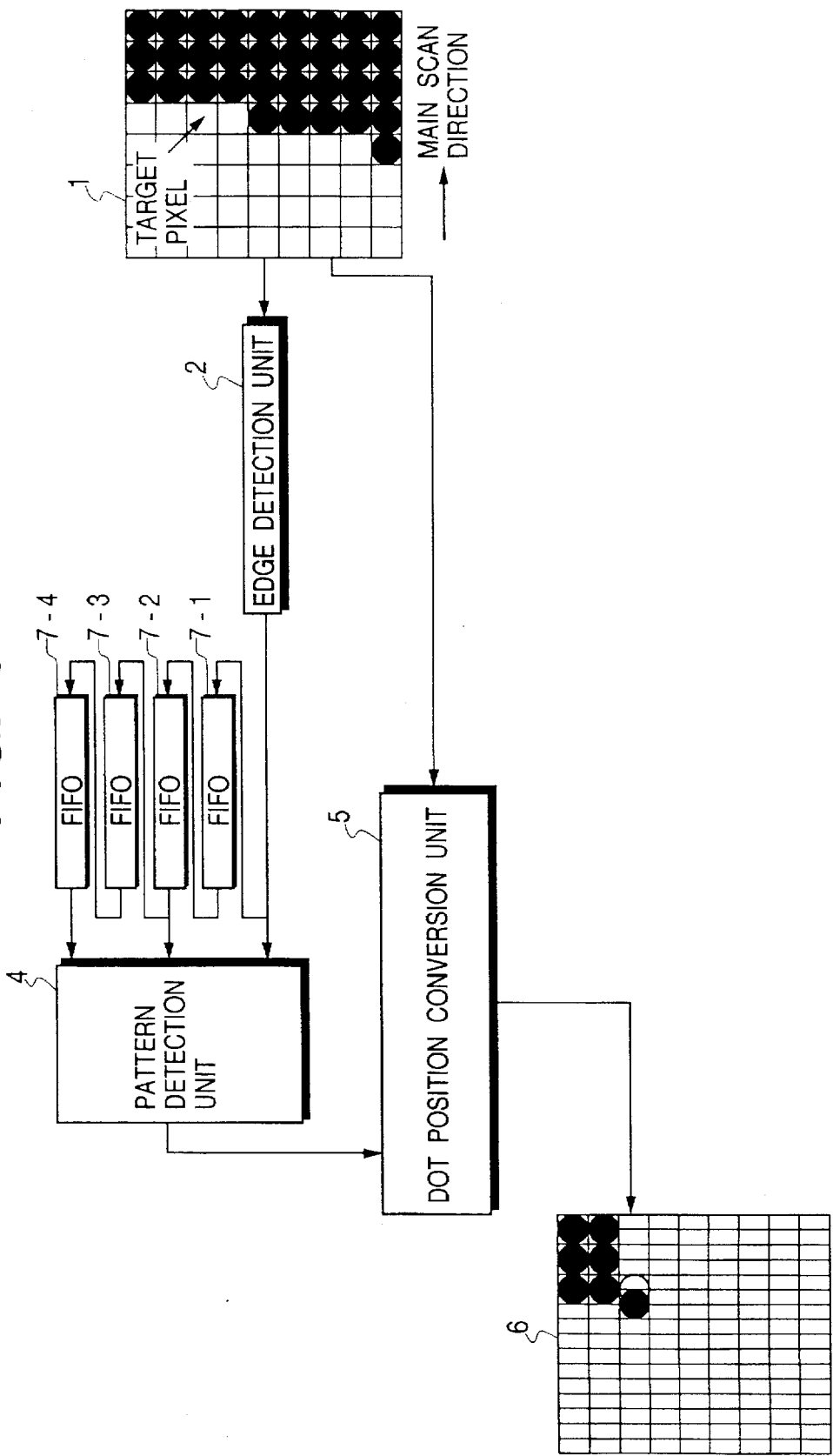

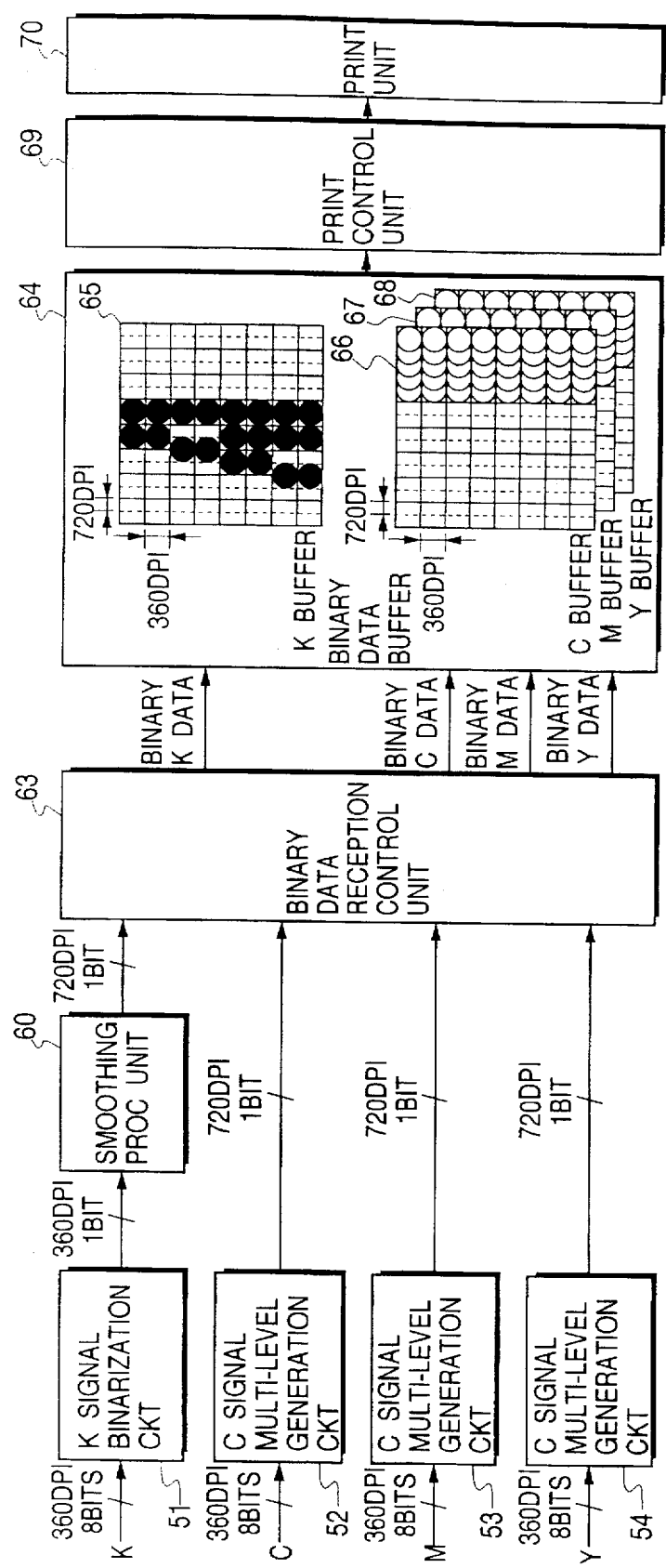

FIG. 12

ERROR DISTRIBUTION WINDOW IN CASE OF PROC IN "→" DIRECTION

| | | * | e0 |
|---|---|---|---|
| | e3 | e2 | e1 |

ERROR DISTRIBUTION WINDOW IN CASE OF PROC IN "←" DIRECTION

| e0 | * | | |
|---|---|---|---|
| | e1 | e2 | e3 |

FIG. 13

EXAMPLE OF ERROR DISTRIBUTION COEFFICIENTS

| | * | $\frac{128}{256}$ |
|---|---|---|
| $\frac{20}{256}$ | $\frac{37}{256}$ | $\frac{71}{256}$ |

IMAGE PROCESSING APPARATUS

BACKGROUND OF THE INVENTION

1. Field of the Invention

The invention relates to an image processing apparatus of an ink jet printer or the like and, more particularly, to an image processing apparatus for outputting an image at a resolution higher than that of input image data. Particularly, the invention relates to an image processing apparatus which can preferably reconstruct an edge portion of an image, even if it is a color image.

2. Related Background Art

Hitherto, such kinds of image processing apparatuses, for example, an ink jet printer for recording by adhering an ink onto the surface to be recorded are known. Most of these apparatuses use a serial recording system in which the recording is performed while moving in the main scan direction a recording head constructed by arranging a plurality of nozzles in the sub scan direction. After completion of the recording of one line, a recording medium is moved in the sub scan direction, the recording head is returned to the recording start position, and the recording of the next line is performed. The recording of one page is subsequently executed in accordance with a similar procedure.

In such a recording apparatus, there is an apparatus using a method whereby in order to raise a recording density, by moving the recording head in the main scan direction at the half pitch of the ordinary pitch, a resolution in the main scan direction is apparently doubled. FIGS. 2 and 3 are diagrams for explaining such a situation. In the recording apparatus having a resolution of 360 d.p.i. (dots per inch) (in the vertical direction)×360 d.p.i. (in the lateral direction), the edge portion is generally recorded as shown in FIG. 2. In case of moving the recording head in the main scan direction (in this case, lateral direction) at the half pitch of the ordinary pitch, the edge portion has to be recorded as shown in FIG. 3. However, since the size of ink droplet which is emitted from the recording head has been designed so as to be a proper value at the original resolution, if the edge portion is recorded as it is, a double amount of ink is adhered onto the recording medium. This results in a drawback that the ink may overflow in dependence on the medium. As a method of solving such a drawback, for example, in the Japanese Patent Laid-Open Application Nos. 6-91881 and 6-99614, methods have been proposed whereby after recording data was previously formed at a high resolution, the data density is reduced and the high resolution recording is also executed.

However, this method of previously forming the high resolution data then reducing the data density has the drawback that system memory is wasted since the high resolution data is formed first. For example, assume that the recording apparatus is a binary recording type which can record 0 or 1, a recording range is set to 11 inches×18 inches and a resolution is equal to 360 d.p.i.×360 d.p.i. Then in the case of recording at double resolution in the main scan direction, 11×360×2×18×360/8=6,415,200 bytes are needed. In case of previously forming data at a high resolution, namely, 720 d.p.i.×720 d.p.i. and reducing the data density, 11×720×18×720/8=12,830,400 bytes are needed, so that memory of double capacity is first necessary. The data amount is reduced to by one half.

According to the method of forming the high resolution data first as mentioned above, the large memory becomes used in vain.

Hitherto, in a color print processing apparatus in which multi-level CMYK signals are inputted and converted to binary CMYK signals by using a pseudo gradation process represented by an error diffusion method and a color print is realized by a binary recording method in accordance with the binary CMYK signals, it is known that in the case where the recording of the double density in the main scan direction or sub scan direction is enabled, the multi-level CMYK signals which were previously doubled in the main scan direction or sub scan direction, namely, in which the density ratio between the vertical density and the lateral density is set to 2:1 or 1:2 are prepared, the pseudo gradation process represented by the error diffusion method is performed to those signals. The binary CMYK signals which were doubled in a desired direction are obtained, and the print is executed at the recording density, that is, a double density in the main scan direction or sub scan direction.

There is, however, a drawback such that in order to preserve the multi-level CMYK signals which were previously doubled in the main scan direction or sub scan direction, a multi-level memory of the double capacity is needed as compared with the case where the signals are not magnified. Further, the processing time which is required for the pseudo gradation process is also doubled, resulting in a factor for reduction of a throughput.

SUMMARY OF THE INVENTION

It is an object of the invention to eliminate the drawbacks of the conventional techniques mentioned above and to provide an image processing apparatus in which data is formed at an inherent resolution of a recording apparatus without previously forming data at a high resolution and, even in the case where a high resolution recording is performed at a double resolution in the main scan direction, the recording of a high quality as if it was formed from the data of a high resolution can be performed by a simple construction and processes.

According to the invention, in order to accomplish the above object, there is provided an image processing apparatus comprising: input means for inputting image data; edge detecting means for detecting an edge from the image data inputted by the input means; pattern detecting means for detecting whether edge data from the edge detecting means coincides with a specific pattern or not; and recording position converting means for converting a recording position of the image data of a specific pixel inputted by the input means when the pattern detecting means detects that the edge data coincides with the specific pattern.

Another object of the invention is to provide an image processing apparatus in which an edge can be detected by detecting the inversion of 1 and 0 and input image data is shifted by a distance of the half dot in accordance with a pattern as an edge detection result and the edge is smoothly corrected, so that an image of a high picture quality can be obtained by extremely simple construction and processes, and since the number of recording dots is not changed as compared with the number of input dots, a density of the input data can be also reconstructed at a high fidelity.

It is an object of the invention to provide a color image forming apparatus in which multi-level color and black image data are doubled, a multi-level memory to store it is unnecessary, the recording at a high resolution can be performed, a gradation of a color image such as a photograph image or the like can be improved, and the outline quality of a black character can be improved.

To accomplish the above objects, according to the invention, there is provided a color image forming apparatus comprising: input means for inputting multi-level color image data and multi-level black image data; first converting means for converting the multi-level color image data inputted by the input means into the data of three levels consisting of at least two bits and for converting into data of a resolution higher than that of the input data; second converting means for converting the black image data inputted by the input means into the binary data and for converting to data of a resolution higher than that of the input data by a smoothing process; and forming means for forming a color image on the basis of the data from the first and second converting means.

Further, another object of the invention is to provide an image processing apparatus in which for a color image signal, input multi-level data of one pixel is converted into data of three levels and is converted into high resolution data. Errors which occur upon conversion are corrected by an error diffusion method, so that when a photograph image or the like is outputted, a color image having an excellent gradation performance can be formed at a high speed. On the other hand, a black image signal, after being binarized by the error diffusion method, is converted into high resolution data by a smoothing process, so that the outline quality of a black character can be improved.

The above and other objects and features of the present invention will become apparent from the following detailed description and the appended claims with reference to the accompanying drawings.

BRIEF DESCRIPTION OF THE DRAWINGS

FIG. 9 is a block diagram showing a construction of an image processing apparatus according to the second embodiment;

FIG. 10 is a block diagram showing a construction of a color image forming apparatus according to the third embodiment of the invention;

FIG. 12 is a diagram showing an error distribution window;

FIG. 13 is a diagram showing error distribution coefficients; and

DETAILED DESCRIPTION OF THE PREFERRED EMBODIMENTS

[Embodiment 1]

Embodiments of the present invention will now be described in detail hereinbelow with reference to the drawings.

Figure 1:
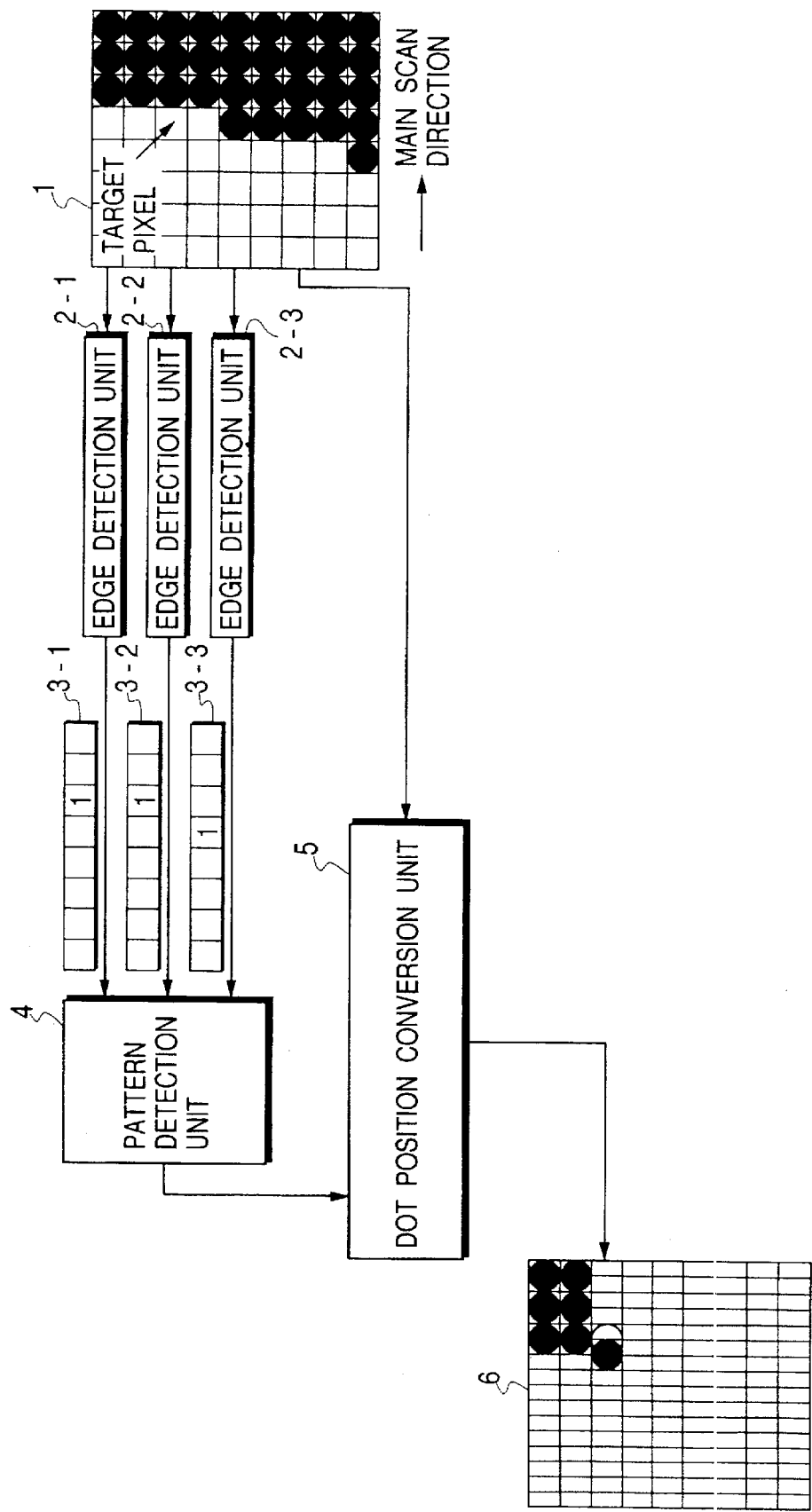
FIG. 1 is a block diagram showing a construction of an image processing apparatus according to the first embodiment.

FIG. 1 is a block diagram for explaining a construction of an image processing apparatus according to the first embodiment of the invention. In the diagram, reference numeral 1 denotes input binary image data which is inputted to the apparatus. A black painted circle indicates a recording dot. In the embodiment, input image data has a resolution of 360 d.p.i. (dots per inch) (in the lateral direction)×360 d.p.i. (in the vertical direction). The main scan direction of a head of a recording apparatus is set to the direction shown by an arrow in FIG. 1.

In the diagram, reference numerals 2-1, 2-2, and 2-3 indicate edge detection units. Each of the edge detection units receives raster data of an input image and for every pixel, compares a dot inputted one pixel before with a dot which is inputted at present, and generates "1" only when they differ. Each of the edge detection units 2-1, 2-2, and 2-3 is constructed by a shift register and a bit operating circuit. In the embodiment, a raster including a target pixel and rasters which are away from the above raster in the upper and lower directions by two rasters, respectively, are inputted to the edge detection units 2-1, 2-2, and 2-3. In the diagram, reference numerals 3-1, 3-2, and 3-3 indicate data which is outputted from the edge detection units 2-1, 2-2, and 2-3 and show pixels in each of which the position indicated by "1" is detected as an edge of input raster data.

Namely, in the edge detection unit 2-1, since the inversion from 0 to 1 is detected at the sixth pixel of the input image data, "1" is shown in the sixth pixel in the data 3-1. Similarly, an edge is also detected at the sixth pixel by the edge detection unit 2-2 and an edge is detected at the fifth pixel by the edge detection unit 2-3.

Figure 5:
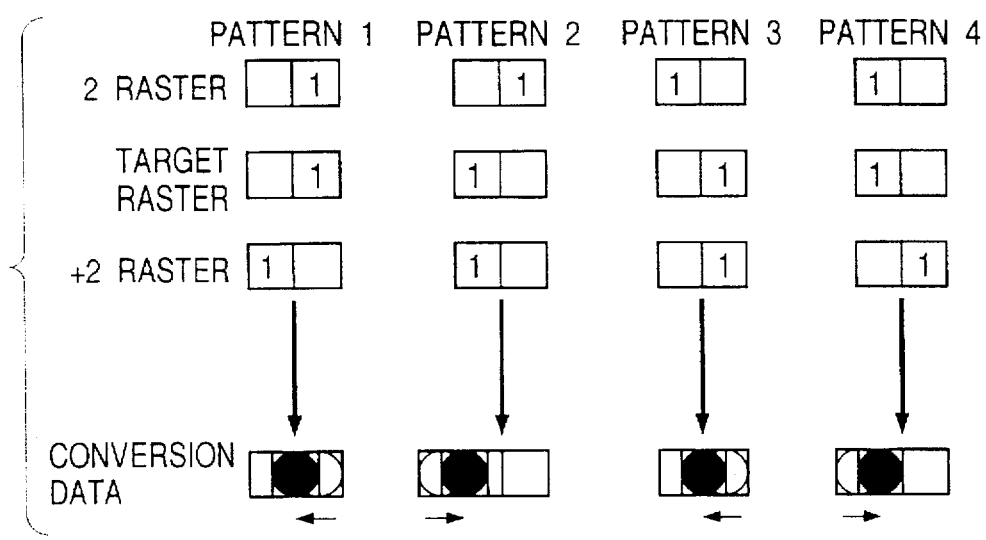
FIG. 5 is a diagram showing a detection pattern and a conversion data corresponding to it.

Output data from those edge detection units is inputted to a pattern detection unit 4. The pattern detection unit 4 detects four patterns as shown in FIG. 5. When those patterns are detected, a pattern detection signal to inform which pattern was detected is transmitted to a dot position conversion unit 5. The pattern detection signal from the pattern detection unit 4 and raster data including the target pixel from input image data 1 are inputted to the dot position conversion unit 5. When the pattern detection signal is inputted, the original data is converted in accordance with the four patterns as shown in FIG. 5 and data corresponding to 720 d.p.i. is generated. How to convert the position of the target pixel of the original data in accordance with the four kinds of patterns which are outputted from the pattern detection unit 4 is shown in FIG. 5. The original data is shown by a white circle and the data after the conversion is shown as a black painted circle. Output data 6 diagrammatically shows data which is generated from the dot position conversion unit 5. In this example, a state in which the pixels of the original data up to the target pixel were processed.

Each of the pattern detection unit 4 and dot position conversion unit 5 is constructed by a shift register and a bit operating circuit.

By repeating those processes every pixel, the process of one raster including the target pixel is finished. Therefore, by repeating the above processes while sequentially shifting one raster by one, the processes for the whole original data can be performed.

Figure 2:
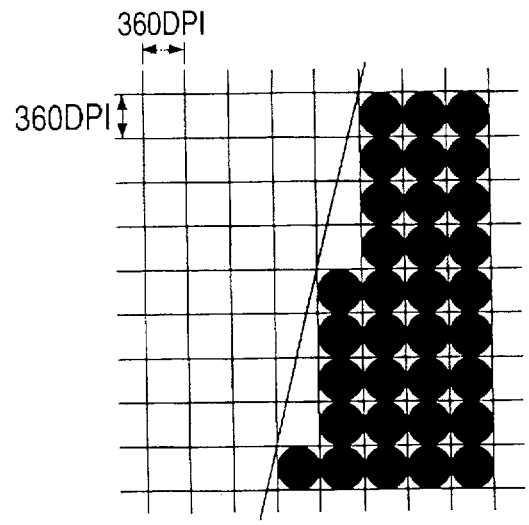
FIG. 2 is a diagram showing ordinary recording data.
Figure 3:
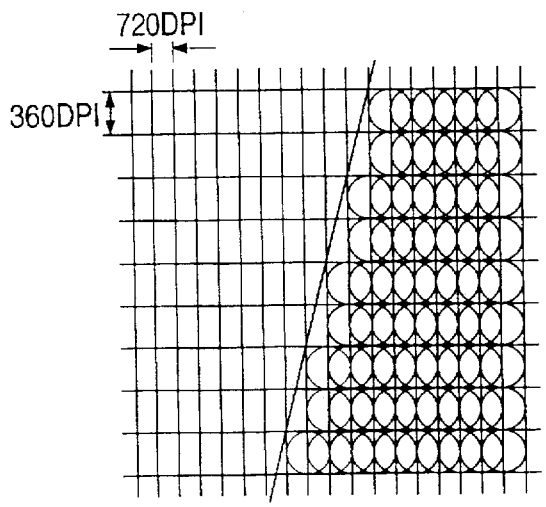
FIG. 3 is a diagram showing data formed at a double resolution in the main scan direction.
Figure 4:
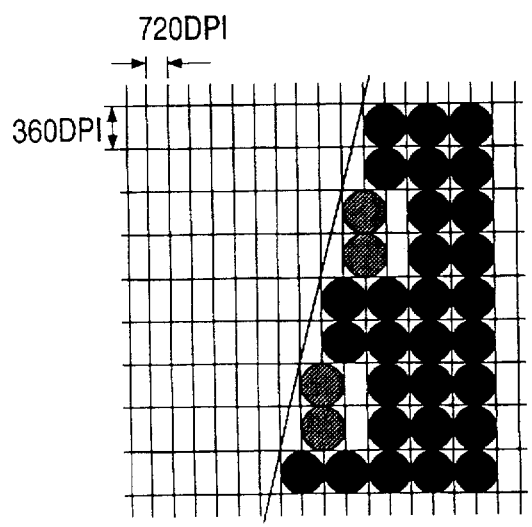
FIG. 4 is a diagram showing data formed by the embodiment.

FIG. 4 is a diagram showing a result in the case where the input data shown in FIG. 2 was processed by the circuit shown in FIG. 1. FIG. 4 shows an example in which an edge pattern which is inclined upward to the right is detected by the pattern 1 shown in FIG. 5, so that the input data is shifted to the left by a distance of the half dot, thereby correcting a zigzag state of the edge.

Figure 6A:
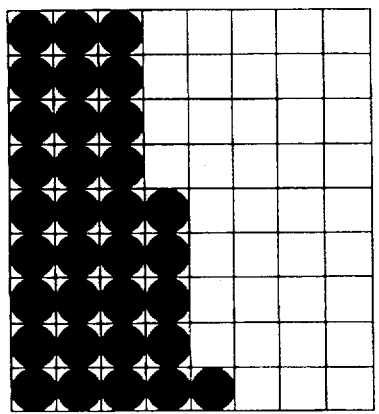
FIGS. 6A–6B, 7A–7B, and 8A–8B are diagrams showing images which are formed by the embodiment.
Figure 6B:
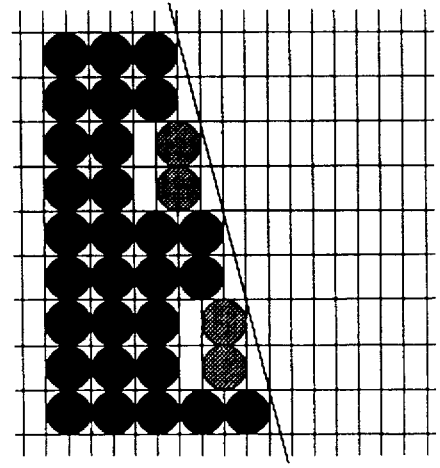

FIG. 6B shows an example in which for input data shown in FIG. 6A, an edge pattern which is inclined downward to the right is detected by the pattern 4 shown in FIG. 5, so that the input data is shifted to the right by a distance of the half dot, thereby correcting a zigzag state of the edge.

Figure 7A:
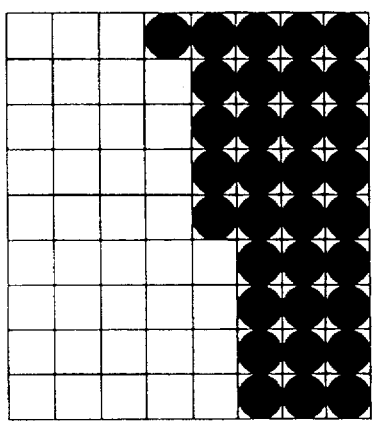
Figure 7B:
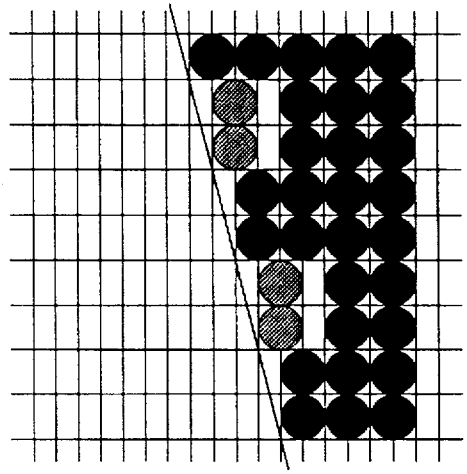

FIG. 7B shows an example in which for input data shown in FIG. 7A, an edge pattern which is inclined upward to the left is detected by the pattern 3 shown in FIG. 5, so that the input data is shifted to the left by a distance of the half dot, thereby correcting a zigzag state of the edge.

Figure 8A:
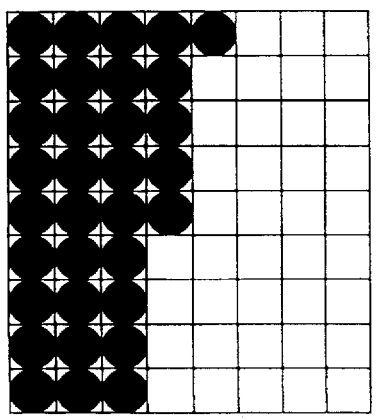
Figure 8B:
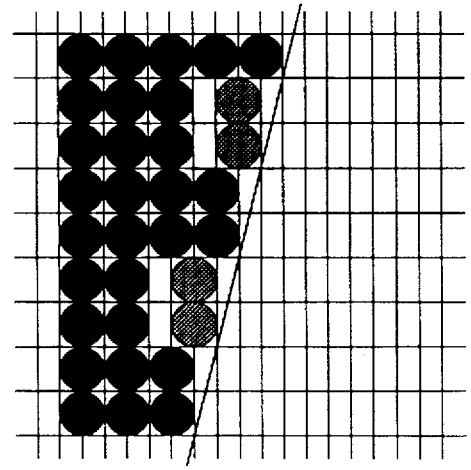

FIG. 8B shows an example in which for input data shown in FIG. 8A, an edge pattern which is inclined downward to the left is detected by the pattern 2 shown in FIG. 5, so that the input data is shifted to the right by a distance of the half dot, thereby correcting a zigzag state of the edge.

According to the embodiment as described above, by detecting the inversion of 1 and 0, the edge can be easily detected and the input image data is shifted by the half dot in accordance with the pattern as an edge detection result, thereby smoothly correcting the edge. Therefore, an image of a high picture quality can be obtained by extremely simple construction and processes. Since the number of recording dots is not changed as compared with the number of input dots, the density of the input data can be reconstructed at a high fidelity.

[Embodiment 2]

FIG. 9 is a block diagram for explaining a construction of an image processing apparatus according to the second embodiment of the invention.

In the embodiment, the edge detection units 2-1, 2-2, and 2-3 used in the first embodiment are constructed as one unit, the detected edge data is once sent to FIFO (First-In/First-Out) memories 7-1, 7-2, 7-3, and 7-4 and is delayed, and after that, the delayed data is supplied to the pattern detection unit 4. With this construction, the edge detection units can be simplified to one unit.

Consequently, after the data was formed at the inherent resolution of the recording apparatus without previously forming the data of a high resolution, even if the high resolution recording of the double resolution in the main scan direction is executed, the recording of a high quality as if it was formed from the data of the high resolution can be performed.

In the above first and second embodiments, although the input image pixel data is the binary image data of one bit, the N-level data constructed by two bits, three bits, ..., N bits, or the like can be also used. In the embodiment, although the rasters which are away from the target raster in the upper and lower directions by two rasters, respectively have been used as rasters which are inputted to the pattern detection unit, the invention is not limited to two rasters but a raster which is further away from the target pixel or a raster which is closer to the target raster can be also used. In the first and second embodiments, although three rasters are inputted to the pattern detection unit, a greater number of rasters can be also inputted. Also, the number of patterns to be detected is not limited to four as it is also possible to construct the invention such that a greater number of patterns can be detected. Further, in the second embodiment, although the dot position conversion unit changes the dot position in accordance with the four detection patterns, the position to be changed is not limited to being determined with exactly four patterns.

Further, although the resolution in the main scan direction is twice as high as that in the sub scan direction in the embodiment, it is not limited to two times.

According to the first and second embodiments as described above, it is possible to provide a high speed processing apparatus utilizing an edge detecting means, a pattern detecting means for detecting the specific pattern from the outputs from the edge detecting means, and a recording position converting means for converting the recording position of the target pixel for the specific pattern detected by the pattern detecting means. With this apparatus, even if the high resolution recording of the double resolution in the main scan direction is performed after the data was formed at the inherent resolution of the recording apparatus without previously forming the data of the high resolution, the recording of a high quality as if it was formed from the data of the high resolution can be performed.

That is, according to the first and second embodiments of the invention as described above, after the data was formed at the inherent resolution of the recording apparatus without forming the data of the high resolution; even if high resolution recording of the double resolution is desired in the main scan direction, the recording of the high quality as if it was formed from the data of the high resolution can be performed by simple construction and processes.

[Embodiment 3]

An example in which a black image signal and a color image signal are inputted, the smoothing process as shown in the embodiments 1 and 2 is executed to the black image signal, the black image signal is converted into high resolution data, and the color image signal is converted to high resolution data of an excellent gradation performance will now be described as a third embodiment.

FIG. 10 is a block diagram showing a construction of an image processing apparatus in the third embodiment of the invention.

Reference numeral 51 denotes a K signal binarization circuit for receiving a K (black) signal comprising eight bits per pixel at a resolution of [360 d.p.i. (in the lateral direction=main scan direction)×360 d.p.i. (in the vertical direction=sub scan direction)] and for binarizing into binary data per pixel at a resolution of 360 d.p.i.×360 d.p.i. by the error diffusion method.

Reference numeral 52 denotes a C signal multi-level forming unit for receiving a C (cyan) signal constructed by eight bits per pixel at a resolution of 360 d.p.i.×360 d.p.i. and for multi-level converting one pixel into three levels of 00, 01 (or 10), and 11 by the error diffusion method, so that the data of eight bits per pixel is converted into the data of two bits per pixel. The data of two bits per pixel at the resolution of 360 d.p.i. is generated as data of one bit per pixel at a resolution of 720 d.p.i.

Reference numerals 53 and 54 denote an M signal multi-level forming circuit and a Y signal multi-level forming circuit each of which is realized by the same circuit construction as that of the C signal multi-level forming circuit 52. The M signal multi-level forming circuit 53 receives an M (magenta) signal at a resolution of 360 d.p.i.×360 d.p.i. and generates a signal of one bit at a resolution of 720 d.p.i.×360 d.p.i. The Y signal multi-level forming circuit 54 receives a Y (yellow) signal at a resolution of 360 d.p.i.×360 d.p.i. and generates the data of one bit at a resolution of 720 d.p.i.×360 d.p.i.

Reference numeral 60 denotes a smoothing processing unit for receiving a K signal of one bit per pixel at a resolution of 360 d.p.i.×360 d.p.i. and, after completion of the smoothing process mentioned in the embodiment 1, generates data of one bit at a resolution of 720 d.p.i.×360 d.p.i.

Reference numeral 63 denotes a binary data reception control unit for receiving the 1-bit data per pixel at a resolution of 720 d.p.i.×360 d.p.i. sent from the smoothing processing unit 60. C signal multi-level forming circuit 52, M signal multi-level forming circuit 53, and Y signal multi-level forming circuit 54, respectively.

Reference numeral 64 denotes a binary data buffer for storing binary K data 65, binary C data 66, binary M data 67, and binary Y data 68, respectively. Reference numeral 69 denotes a print control unit for controlling the print in accordance with the binary C, M, Y, and K data from the binary data buffer 64. Reference numeral 70 denotes a print unit for recording a full color image onto a recording paper on the basis of the C, M, Y, and K data in accordance with the control of the print control unit 69. The print unit 70 forms a full color image by an ink jet system or a laser beam system.

Figure 11:
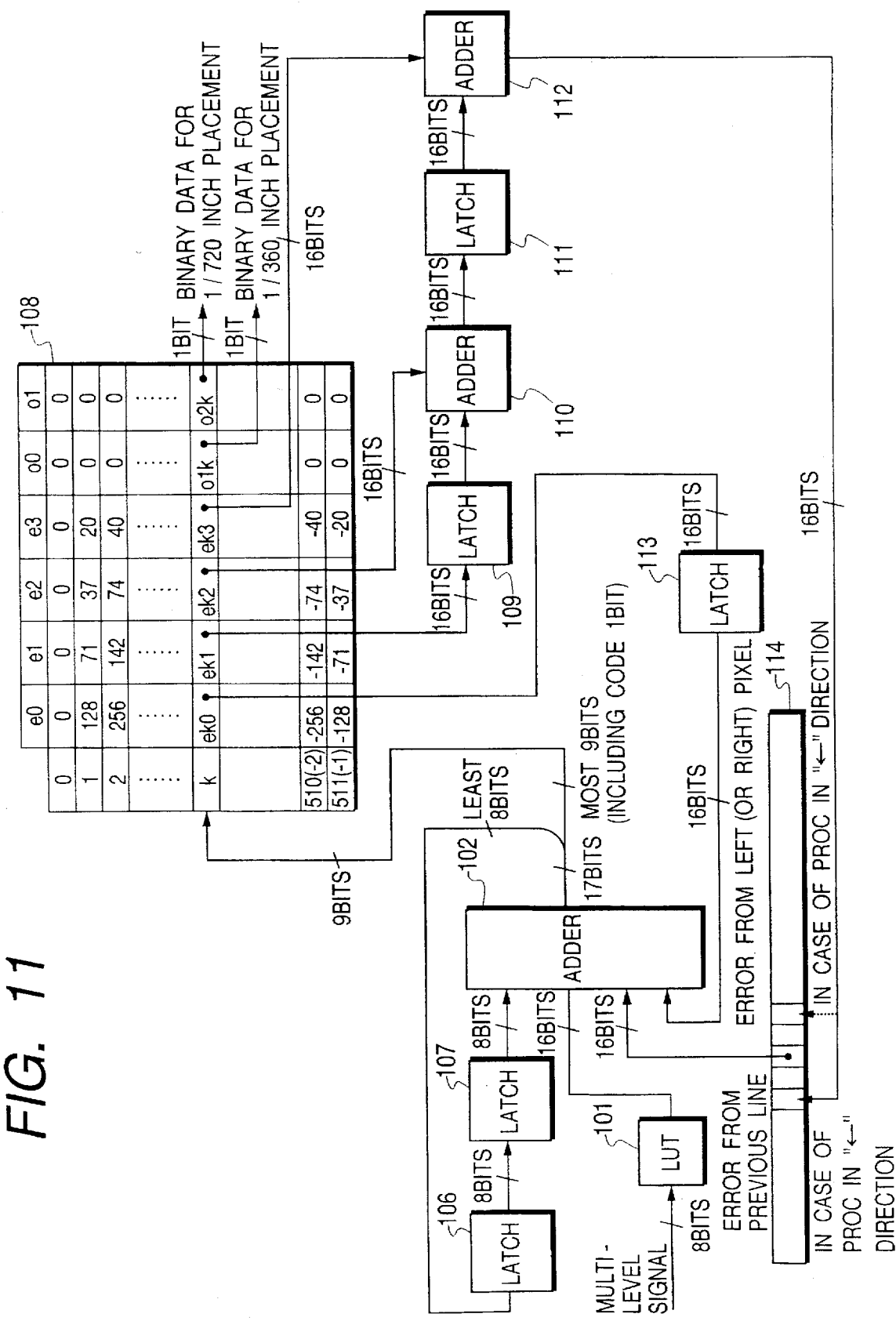
FIG. 11 is a block diagram showing the details of C, M, and Y signal multi-level forming circuits 52, 53, and 54.

FIG. 11 is a block diagram showing a multi-level forming circuit which is commonly used for the C, M, and Y signal multi-level forming circuits 52, 53, and 54. The multi-level forming circuit of FIG. 11 receives data of eight bits per pixel at a resolution of 360 d.p.i.×360 d.p.i. and generates data of three levels of 00, 01 (or 10), and 11. In 00, the left data is binary data for 1/720 inch placement and the right data is binary data for 1/360 inch placement.

In FIG. 11, the input image pixel data which is inputted from the left is multi-level image data of eight bits and is first inputted to a lookup table (LUT) 101. The LUT 101 is a table to compensate a linearity of an output for the input data to be subjected to a pseudo gradation process. A value of 16 bits is outputted for an input value of eight bits.

Further, a value (256 in case of distribution coefficients in FIG. 13) of the denominator of the distribution coefficients when errors are distributed to the input data has been multiplied. Reference numeral 102 denotes an adder for adding error data from the pixels which have already been quantized to three levels to the 16-bit data from the LUT 101.

The adder 102 adds a round error (error of a remainder which occurs when the errors are distributed) which is outputted from a latch 107, an error from the previous line which was read out from an error buffer 114, and an error from the pixel on the left or right side which is outputted from a latch 113 to the 16-bit data from the LUT 101.

In the embodiment, the error distribution coefficients as shown in FIG. 13 are used. The number of the denominator of the error distribution coefficients is the square of 16 (the eighth power of 2). The data from the adder 102 is divided by the value of the denominator of the distribution coefficients. However, the division is performed by a bit shifting method. As for the arithmetic operation result of the adder 102, the most significant nine bits, including a code bit, correspond to the quotient in the case where the data from the adder 102 is divided by the eighth power of 2. The code bit and the least significant eight bits correspond to the remainder in the case where the data from the adder 102 is divided by the eighth power of 2.

Thus, the quotient (most significant nine bits from the adder 102) becomes a reference value to refer to an error distribution table 108 and the remainder (least significant eight bits from the adder 102) becomes a round error less than 1 that is inputted to a latch 106.

The error distribution table 108 refers to the most significant nine bits which are generated from the adder 102.

The latches 106 and 107 are used to distribute to the outside of the pixel shown by the round error distribution table. After a delay corresponding to two pixels is given, the least significant eight bits are again inputted to the adder 102. The quotient, the most significant 9-bit data which is outputted from the adder 102, is inputted as a reference value to the error distribution table 108. The error distribution table 108 is a lookup table constructed by a RAM (random access memory) or ROM (read only memory). A value which was increased the denominator times a predetermined weight coefficient for every value of the quantization errors and binary data corresponding to the 1/360 inch dot placement and 1/720 inch dot placement have been stored in the lookup table. The values corresponding to an error distribution window as shown in FIG. 12 have been stored in the error distribution table 108. Since each value has been increased by the denominator times the error distribution coefficients in accordance with the values of the quantization errors, each value is expressed by the number of 16 bits.

In the embodiment, the two right and left symmetrical error distribution windows as shown in FIG. 12 are switched and used every raster in accordance with the processing direction. Since the error distribution windows are symmetrical with respect to the right and left, it is sufficient to use one error distribution table. Four values of ek0, ek1, ek2, and ek3 are outputted from the error distribution table 108 in accordance with the value of the quotient which is outputted from the adder and correspond to the values of error distribution windows e0, e1, e2, and e3 shown in FIG. 11, respectively. Therefore, the output ek0 is inputted to the latch 113 and is delayed by a time corresponding to one pixel and, after that, the delayed output is again inputted to the adder 102. The output ek1 is inputted to a latch 109 and is delayed by a time of one pixel and, after that, the delayed output is inputted to an adder 110 and is added to the output ek2. Further, an output of the adder 110 is inputted to a latch 111 and is delayed by a time of one pixel and, after that, the delayed output is inputted to an adder 112 and is added to the output ek3. An output of the adder 112 is written into the error buffer 114.

For example, when the quotient, the most significant 9-bit data from the adder 102, is equal to 1 and the remainder, the least significant 8-bit data is equal to 50; the error data of 128 is distributed to e0. Similarly, the error data of 71, 37, and 20 is distributed to e1, e2, and e3, respectively. The error data of 50 is distributed to the pixel which is adjacent to e0 on the right side.

The location at which the error is written is the location which is away from the target pixel to the right or left by two pixels in the direction of the quantizing process in the embodiment. The direction of the quantizing process is switched every raster.

Namely, the circuit of FIG. 11 switches the process in the → direction from the left to the right and the process in the ← direction from the right to the left every line of the input data. As shown in FIG. 11, the storing position into the error buffer 114 of the error data from the adder 112 is changed in the case of the process in the → direction and the case of the process in the ← direction. This control is executed by a control circuit (not shown).

By executing a zigzag process for changing the processing direction to the → direction and the ← direction every line, the occurrence of a unique stripe pattern which is a problem with the error diffusion method, can be prevented.

After completion of the quantizing process has been stored in the error distribution table 108 in accordance with the values of the most significant nine bits of the adder 102, the data, o0 and o1 are outputted. o0 and o1 correspond to the binary data corresponding to the 1/720 inch dot placement and 1/360 inch dot placement, respectively.

On the basis of the binary data of 720 d.p.i., an image is formed by an ink jet printer (not shown).

Since the pseudo gradation process for one input data is finished by the above processes, by repeating the above processes while shifting one pixel at a time in the processing direction, the pseudo gradation process for the whole image can be performed.

According to the embodiment as mentioned above, when the input data is quantized to at least three levels [00, 01 (or 10), 11], the quantization results have previously been stored in the table without performing the binarizing process for every level. The quantizing process by the error diffusion method to three or more levels can be performed by a simple circuit construction. Since the processes shown in FIG. 11 are used for the color image signals of three colors of C, M, and Y, a color image of a high picture quality of excellent gradation performance can be obtained.

Further, the least significant 8-bit data from the adder 102 has an integer value between 0 and 255 in the embodiment. However, since eight bits (0–255) of the input data has been multiplied by 256 by the LUT 101, remaining 8-bit of input data is equal to a value between 0 and 255/256 and is set to a value less than 1 for these eight bits of the input data. Thus, the value of the round error can be reduced. Particularly, a picture quality in the highlight portion of the image can be improved.

According to the embodiment as mentioned above, since the value of the binarization error which was increased by denominator times the weight coefficient and the quantization data which was quantized to at least three levels have previously been calculated and stored into the table, the multiplier and divider for every weight coefficient can be omitted, the circuit scale can be reduced, and the high speed processes can be performed. Further, the sum of the density of the input pixel and the errors distributed from the peripheral pixels is obtained, the error value stored in the table is selected on the basis of the sum and distributed to the peripheral pixels, and the remainder is also distributed to the peripheral pixels. Thus, a flexibility can be provided for the weight coefficient, the value of the round error can be set to a value within a range from 0 to less than 1, and a picture quality of an image including the highlight portion can be improved.

Processes for the K signal will now be described.

Figure 14:
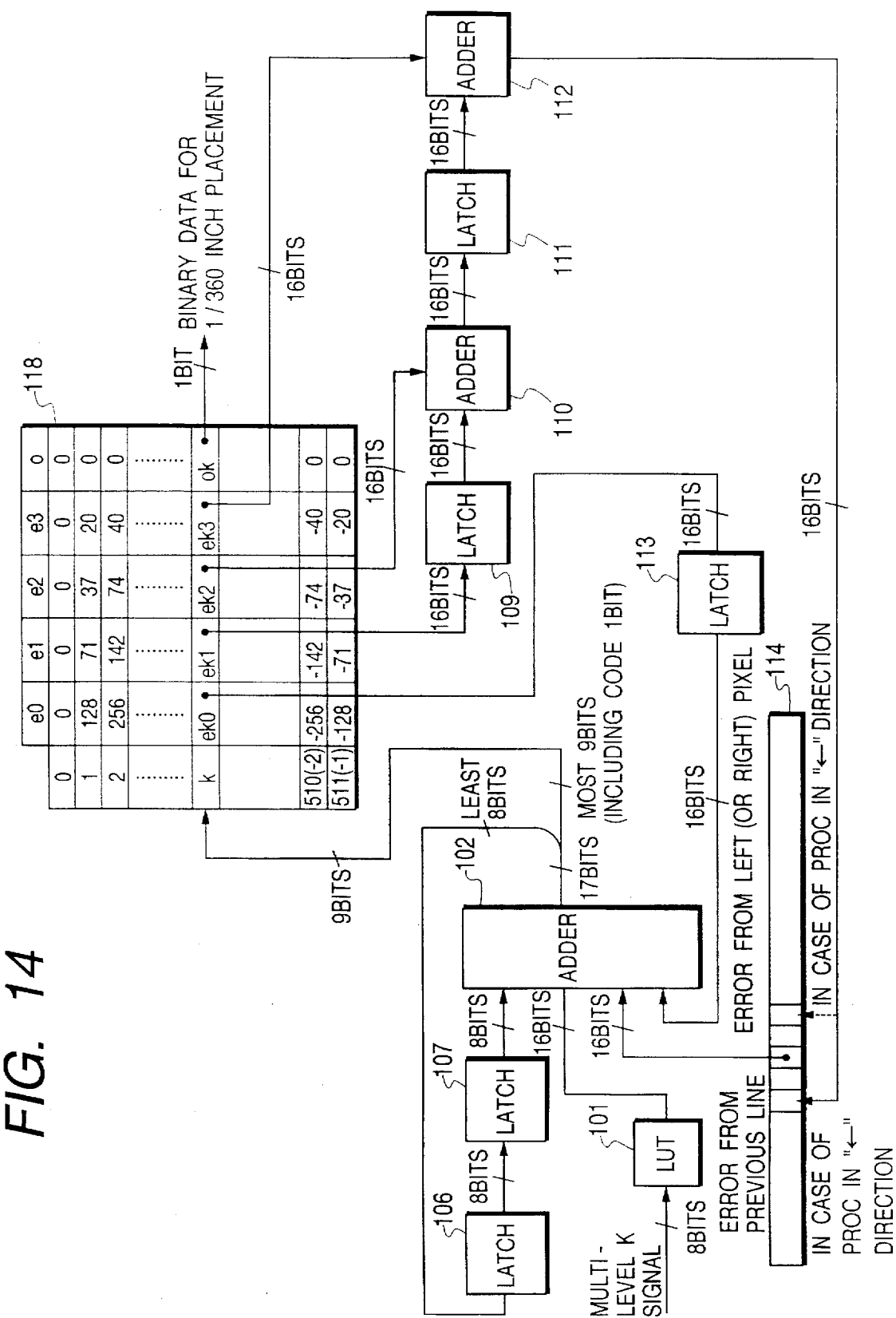
FIG. 14 is a block diagram showing the details of a K signal binarization circuit 51.

FIG. 14 is a block diagram showing the details of the K signal binarization circuit 51. In the K signal binarization circuit shown in FIG. 14, the multi-level image signal of eight bits per pixel at a resolution of 360 d.p.i.×360 d.p.i. is converted into the binary signal (binary data for 1/360 inch placement) at a resolution of 360 d.p.i.×360 d.p.i. by the error diffusion method.

In FIG. 14, the same component elements as those shown in FIG. 11 are designated by the same reference numerals and their descriptions are omitted.

FIG. 14 differs from FIG. 11 with respect to the values of the quantized data stored in the error distribution table. Binary data of one pixel for 1/360 inch placement has been stored in an error distribution table 118 of the K signal binarization circuit for the input data of one pixel.

In FIG. 10, reference numeral 60 denotes the smoothing processing unit for receiving the binary K data at 360 d.p.i.×360 d.p.i. sent from the K signal binarization circuit 51 and generating the smoothed binary K data at a resolution at 720 d.p.i.×360 d.p.i.

The details of the smoothing processing unit are substantially the same as those mentioned in the embodiment 1 and will be described with reference to FIGS. 1 and 4 to 8B.

FIG. 1 is a block diagram showing the details of the smoothing processing unit 60. In the diagram, reference numeral 1 denotes the binary data which is inputted to the smoothing processing unit 60 and a black painted circle shows the recording dot. In the embodiment, the binary K data has a resolution of 360 d.p.i. (in the lateral direction) ×360 d.p.i. (in the vertical direction).

In the diagram, reference numerals 2-1, 2-2, and 2-3 indicate the edge detection units. Each of the edge detection units receives the raster data every pixel, compares the dot inputted one pixel before and the dot which is inputted at present, and generates a "1" only when they are different. Each of the edge detection units comprises a shift register and a bit operating circuit. In the embodiment, the raster including the target pixel and the rasters which are away from such a raster by a distance of two rasters in the upper and lower directions are inputted to the edge detection units 2-1, 2-2, and 2-3, respectively. Reference numerals 3-1, 3-2, and 3-3 denote the data which is outputted from the edge detection units 2-1, 2-2, and 2-3 and indicate the pixels in which the position shown by 1 is detected as an edge of the input raster data.

Namely, in the edge detection unit 2-1, since the inversion from 0 to 1 is detected at the sixth pixel of the input image data, 1 is shown at the sixth pixel in the pixel 3-1. Similarly, the edge is detected at the sixth pixel by the edge detection unit 2-2. The edge is detected at the fifth pixel by the edge detection unit 2-3.

The output data from the edge detection units is inputted to the pattern detection unit 4. The pattern detection unit 4 detects four patterns as shown in FIG. 5 and transmits a pattern detection signal to notify which pattern was detected to the dot position conversion unit 5 when those patterns are detected. The pattern detection signal from the pattern detection unit 4 and the raster data including the target pixel from the binary K data 1 are inputted to the dot position conversion unit 5. When the pattern detection signal is inputted, the dot position conversion unit 5 converts the original data in accordance with the four patterns as shown in FIG. 5 and generates the data corresponding to 720 d.p.i. How to convert the position of the target pixel of the original data in accordance with the four kinds of patterns which are outputted from the pattern detection unit 4 is shown in FIG. 5. The original data is shown by a white circle. The data after the conversion is shown by a black painted circle. The output data 6 diagrammatically shows the data which is outputted from the dot position conversion unit 5 and is sent to the binary data reception control unit 63. In this example, a state in which the data was processed up to the target pixel of the original data is shown.

Each of the pattern detection unit 4 and dot position conversion unit 5 is constructed by a shift register and a bit operating circuit.

By repeating those processes every pixel, the process of one raster including the target pixel is finished. Therefore, by repeating the above processes while shifting one raster by one, the processes for the whole original data can be performed.

FIG. 4 shows a diagram in the case where the input data shown in FIG. 2 was smoothed. FIG. 4 shows an example in which an edge pattern which is inclined upward to the right is detected by the pattern 1 shown in FIG. 5 and the input data is shifted to the left by a distance of the half dot, thereby correcting a zigzag state of the edge.

FIG. 6B shows an example in which for the input data shown in FIG. 6A, an edge pattern which is inclined downward to the right is detected by the pattern 4 shown in FIG. 5 and the input data is shifted to the right by the half dot, thereby correcting a zigzag state of the edge.

FIG. 7B shows an example in which for the input data shown in FIG. 7A, an edge pattern which is inclined upward to the left is detected by the pattern 3 shown in FIG. 5 and the input data is shifted to the left by the half dot, thereby correcting a zigzag state of the edge.

FIG. 8B shows an example in which for the input data shown in FIG. 8A, an edge pattern which is inclined downward to the left is detected by the pattern 2 shown in FIG. 5 and the input data is shifted to the right by the half dot, thereby correcting a zigzag state of the edge.

As described above, according to the smoothing processing unit of the embodiment, by detecting the inversion between 1 and 0, the edge can be easily detected. In accordance with the pattern as an edge detection result, the input image data is shifted by a distance of the half dot and edge is smoothly corrected. Therefore, an image of a high picture quality can be obtained by extremely simple construction and processes. Since the number of recording dots is not changed from the number of input dots, the density of the input data can be also reconstructed at a high fidelity.

According to the embodiment 3 as described above, for the color image signal, the input multi-level data of one pixel is converted to the data of three levels and converted into the high resolution data and the errors at the time of the conversion are also corrected by the error diffusion method. Therefore, when a photograph image or the like is outputted, a color image having an extremely excellent gradation performance can be formed at a high speed.

Further, in the embodiment, for the black image signal, after it was binarized by the error diffusion method, the binary data is converted to the high resolution data by the smoothing process. Therefore, the outline quality of a black character can be improved.

Further, in the embodiment, the conversion into the high resolution data can be executed at a high speed without using the multi-level memory.

According to the embodiment, moreover, since the smoothing process for the black image signal is performed by shifting the dots, the smoothing can be executed without increasing an ink amount.

In order to obtain the multi-level CMYK signal under the limited memory environment, a banding process is generally used in which one page is divided into a plurality of bands and processed. This banding processing allows an application to draw bit map data by multi-level RGB signals. However, in the case of magnifying two times, a banding memory of a double capacity is needed. Therefore, banding processes of twice the number of times are necessary, which becomes a factor in the deterioration of the throughput. According to the embodiment, however, since the multi-level CMYK signals can be handled in a state in which the magnification of two times is not performed, the banding memory can be saved. In association with it, there is an advantage in that the time that is required for the pseudo gradation process is almost equal to the time in the case where the magnification of two times is not performed.

The number of banding processing times mentioned above can be also set to the same number in the case where the doubling process is not performed.

In the embodiment 3, since the resolution in the main scan direction of the color image data is converted from 360 d.p.i. to 720 d.p.i., the data of one pixel has been converted to three levels of two bits of [00, 10 (or 01), 11]. In case of converting from 360 d.p.i. to 1080 d.p.i., however, it is sufficient to convert the data of one pixel into three levels of three bits of [000, 010, 111].

Although the embodiment has been described with respect to the example in which the resolution is raised in the main scan direction, the resolution can be also improved in the sub scan direction or in both of the main and sub scan directions.

According to the embodiment 3 of the invention as described above, the multi-level color data and black image data are doubled and the multi-level memory for storing the doubled data is unnecessary, the recording can be performed at a high resolution, the gradation performance of a color image such as a photograph image or the like can be improved, and the outline quality of a black character can be improved.

What is claimed is:

1. An image processing apparatus comprising:

input means for inputting image data;

edge detecting means for detecting an edge from the image data inputted by said input means;

pattern detecting means for detecting whether the edge data from said edge detecting means coincides with a specific pattern or not; and recording position converting means for converting a recording position of the image data of a specific pixel inputted by said input means when said pattern detecting means detects that said edge data coincides with said specific pattern.

2. An apparatus according to claim 1, wherein said input means inputs binary image data and said edge detecting means detects the edge when the binary image data inputted is inverted from 0 to 1 or from 1 to 0.

3. An apparatus according to claim 1, wherein said recording position converting means shifts the recording position of the image data of said specific pixel by a distance corresponding to a half dot.

4. An image processing apparatus comprising:

input means for inputting multi-level color image data and multi-level black image data;

first converting means for converting the multi-level color image data inputted by said input means into data of at least three levels consisting of two bits, thereby converting into data of a higher resolution than the input data;

second converting means for converting the black image data inputted by said input means into binary data, thereby converting into data of a higher resolution than the input data by a smoothing process; and forming means for forming a color image on the basis of the data from said first and second converting means.

5. An apparatus according to claim 4, wherein said second converting means shifts the position of the data indicative of a formation of a dot in the binary data derived from the black image data, thereby performing the smoothing process.

6. An apparatus according to claim 4, wherein said first converting means converts the inputted multi-level color image data into the data of at least three levels consisting of two bits by an error diffusion method.

7. An apparatus according to claim 4, wherein said second converting means comprises:

binarizing means for converting the inputted black image data into binary data by an error diffusion method; and smoothing processing means for smoothing the binary data from said binarizing means, thereby converting into data of a higher resolution, than the input data.

8. An image processing method comprising:

an inputting step of inputting image data;

an edge detecting step of detecting an edge from the image data inputted in said inputting step;

a pattern detecting step of detecting whether edge data from said edge detecting step coincides with a specific pattern or not; and a recording position converting step of converting a recording position of the image data of said specific pixel inputted in said inputting step when it is detected in said pattern detecting step that said edge data coincides with said specific pattern.

9. A method according to claim 8, wherein binary image data is inputted in said inputting step and the edge is detected in said edge detecting step in the case where the inputted binary image data is inverted from 0 to 1 or from 1 to 0.

10. A method according to claim 8, wherein the recording position of the image data of said specific pixel is shifted by a distance corresponding to a half dot in said recording position converting step.

11. An image processing method comprising:

an inputting step of inputting multi-level color image data and multi-level image data;

a first converting step of converting the multi-level color image data inputted in said inputting step into data of at least three levels consisting of two bits, thereby converting into data of a higher resolution than the input data;

a second converting step of converting the black image data inputted in said inputting step, thereby converting into data of a higher resolution than the input data by a smoothing process; and a forming step of forming a color image on the basis of the data from said first and second converting steps.

12. A method according to claim 11, wherein in said second converting step, a position indicative of a formation of a dot in binary data obtained from the black image data is shifted, thereby performing the smoothing process.

13. A method according to claim 11, wherein in said first converting step, the inputted multi-level color image data is converted into data of at least three levels consisting of two bits by an error diffusion method.

14. A method according to claim 11, wherein said second converting step comprises:

a binarizing step of converting the inputted black image data into binary data by an error diffusion method; and a smoothing processing step of smoothing the binary data from said binarizing step, thereby converting into data of a higher resolution, than the input data.

* * * * *

UNITED STATES PATENT AND TRADEMARK OFFICE
CERTIFICATE OF CORRECTION

PATENT NO. : 5,751,929
DATED : May 12, 1998
INVENTOR(S) : NOBUO OHNUMA ET AL.

Page 1 of 2

It is certified that error appears in the above-identified patent and that said Letters Patent is hereby corrected as shown below:

ON THE TITLE PAGE AT [73]
　　Assignee, "Canon Kabushiki Kaisha, Japan" should read --Canon Kabushiki Kaisha, Tokyo, Japan--.

COLUMN 1
　　Line 67, "to" should be deleted.

COLUMN 6
　　Line 36, "[360" should read --360--;
　　Line 65, "embodiment 1," should read --first embodiment,--.

COLUMN 10
　　Line 2, "embodiment 1" should read --first embodiment--.

COLUMN 11
　　Line 21, "edge" should read --the edge--.

UNITED STATES PATENT AND TRADEMARK OFFICE
CERTIFICATE OF CORRECTION

PATENT NO. : 5,751,929
DATED : May 12, 1998
INVENTOR(S) : NOBUO OHNUMA ET AL.

It is certified that error appears in the above-identified patent and that said Letters Patent is hereby corrected as shown below:

<u>COLUMN 13</u>
　　　Line 3, "resolution," should read --resolution--.

<u>COLUMN 14</u>
　　　Line 27, "resolution," should read --resolution--.

Signed and Sealed this

Sixteenth Day of March, 1999

Attest:

Q. TODD DICKINSON

*Attesting Officer*　　*Acting Commissioner of Patents and Trademarks*